Jan. 28, 1947.  D. D. STREID  2,414,841
COOLING MEANS FOR GAS TURBINE WHEELS
Original Filed Feb. 23, 1942
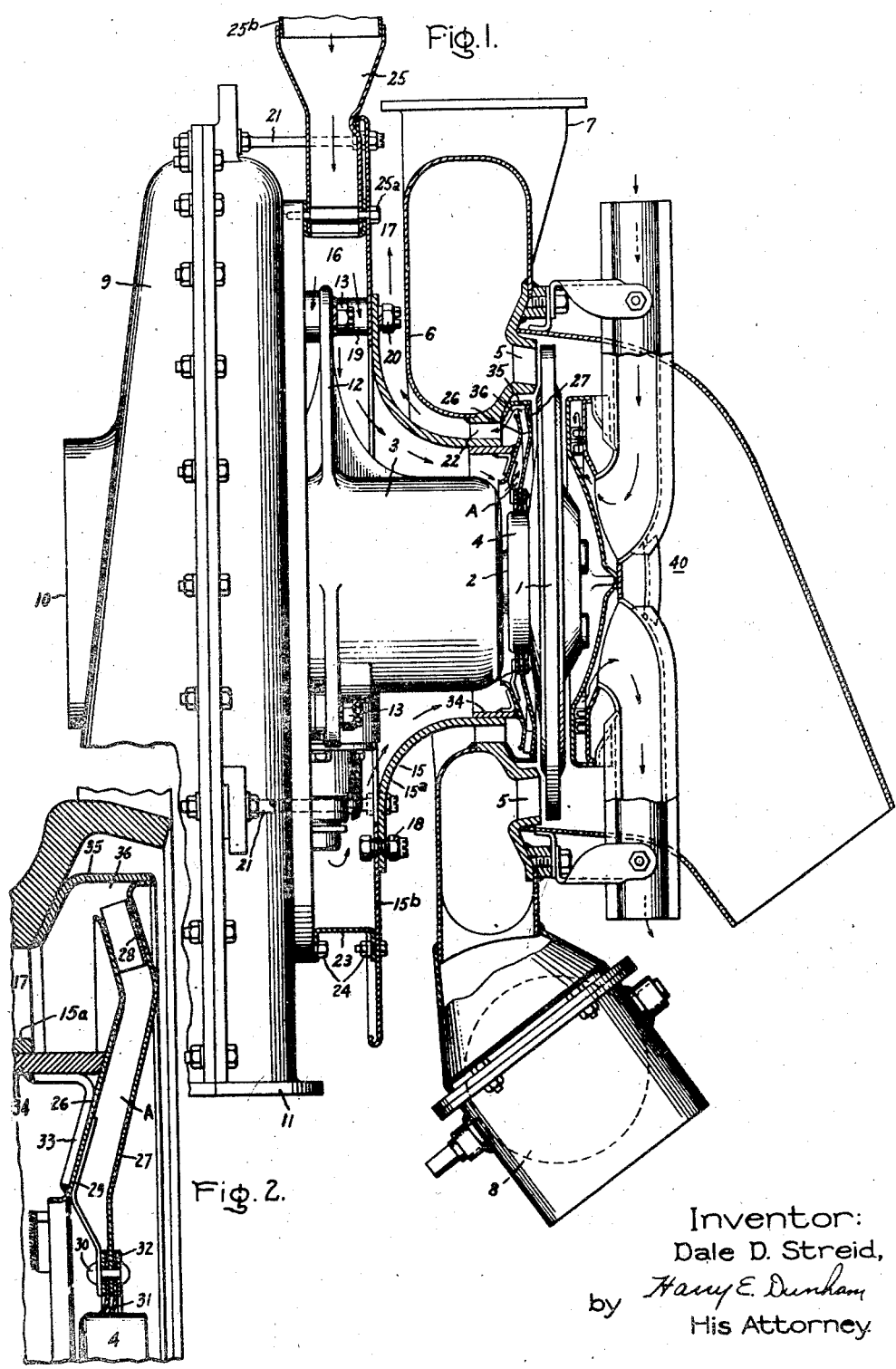
Inventor:
Dale D. Streid,
by Harry E. Dunham
His Attorney.

Patented Jan. 28, 1947

2,414,841

UNITED STATES PATENT OFFICE 2,414,841

COOLING MEANS FOR GAS TURBINE WHEELS

Dale D. Streid, West Lynn, Mass., assignor to General Electric Company, a corporation of New York Original application February 23, 1942, Serial No. 431,924. Divided and this application May 19, 1945, Serial No. 594,626

5 Claims. (Cl. 60—41)

This invention relates to high temperature gas turbines and especially to cooling means for the bearings and wheels of such turbines.

The invention is well adapted for use in connection with gas turbine driven superchargers for aircraft and it is this application of my invention which I have elected specifically to illustrate and describe. It is to be understood, however, that the invention is not limited thereto necessarily.

An object of my invention is to provide an improved construction and arrangement for cooling gas turbine bearings and wheels, and for a consideration of what I believe to be novel and my invention, attention is directed to the following specification and the claims appended thereto.

In the drawing, Fig. 1 is a side elevation, partly in section, of a gas turbine driven supercharger embodying my invention, and Fig. 2 is a sectional view on an enlarged scale of a portion of the structure shown in Fig. 1.

Referring to the drawing, 1 indicates the turbine wheel of a supercharger overhung on the end of a shaft 2 carried in a bearing housing 3. On its inner side wheel 1 is provided with a hub 4. Hot gas is supplied to the buckets of the turbine wheel by a ring of nozzles 5 forming a part of an annular nozzle box 6 which surrounds bearing 3 in radially spaced relation thereto. Gases, for example exhaust gas from an aircraft engine, are conveyed to the nozzle box through inlet conduit 7. At 8 is the usual waste-gate for regulating the pressure of the gases in the nozzle box in a well-known manner.

On the other end of shaft 2 is the impeller of a centrifugal compressor located in compressor casing 9. The inlet to the compressor is indicated at 10 and the discharge at 11. The compressor casing 9 is spaced axially from nozzle box 6 and is supported from bearing 3 by a plurality of spaced arms 12 formed integral with the bearing housing 3 and attached by suitable threaded fastenings 13 to the compressor casing.

The structure so far described is a known one and is to be taken as typical of any suitable gas turbine driven compressor or turbosupercharger.

Located in the annular space defined by the compressor, the nozzle box and the bearing housing, is an annular curved wall 15 which divides such space into two curved annular passages 16 and 17. In the present instance, wall 15 is represented as being formed by the main support baffle 15a and the annular cooling air shroud disc 15b suitably fastened together by bolts 18. The radially inward edge of wall 15a terminates adjacent but spaced from the web of turbine wheel 1; the outer edge of disc 15b terminates somewhat beyond the outer peripheral portion of nozzle box 6. Wall 15a is supported at its central portion by a plurality of circumferentially spaced bosses 19 formed integral with arms 12 and against which the wall rests and to which it is attached by studs with nuts 20. Shroud disc 15b may be supported at its periphery by a plurality of stay bolts 21 which at one end are attached to the compressor casing flange and at the other end to the disc. Wall 15a is supported at its inner edge by a number of circumferentially spaced lugs 22 suitably welded to the wall and to the adjacent surfaces of nozzle box 6. Thus, wall 15 is fixed in spaced relation to the nozzle box and the bearing housing.

Passage 16 forms an annular cooling air admission passage and is closed around its periphery by a circular band or shroud 23 having outturned flanges which are attached to shroud disc 15b and to the compressor casing by rings of spaced threaded fastenings 24. At one location in its circumference, shroud 23 is provided with an opening with which communicates an air admission duct adapter 25 secured by means of bolts 25a.

When the supercharger is mounted on an aircraft, adapter 25 is connected to a suitable conduit 25b having an open end or "ram" which faces into the slip stream and which serves to convey air from the slip stream to adapter 25 and through it to passage 16. Thus passage 16 is supplied with cooling air from the aircraft slip stream at a pressure somewhat above ambient atmospheric pressure. It will be obvious that this cooling air may be obtained from other suitable sources.

At the inner end of wall 15a is a sealing plate assembly A, shown in enlarged section in Fig. 2. It comprises two circular metal plates or discs 26 and 27 held in spaced relation to each other at their outer edges by circumferentially spaced U-shaped spacers 28 welded to the plates, and at their inner edges by circumferentially spaced straps 29 which are welded to plate 26 and are attached to plate 27 by rivets 30. Rivets 30 serve also to attach to plate 27 a plurality of packing or sealing rings 31 which cooperate with the peripheral surface of rotating hub 4 to prevent flow of air to the annular space between plate 27 and the turbine wheel. Rubbing seal rings 31 may be made of copper or other suitable soft metal and are held between rings 32. Sealing plate assembly A is attached to wall 15a by circumferentially spaced angle brackets 33 welded to plate 26 and to a reinforcing ring 34 which forms a continuation of and is fixed to wall 15a. Ring 34 abuts tightly against plate 26 to prevent flow of air therebetween. The assembly A is attached to the outer surface of the nozzle box by a ring 35 which at one edge is welded to an out-turned peripheral edge of plate 27 and at the other edge to the nozzle box. Ring 35 is spaced from the periphery of plate 26 and the space between provides an annular air flow passage 36 which connects the space between plates 26 and 27 to cooling air discharge passage 17.

The path of the cooling air is shown by the arrows in Fig. 1. Air flows through duct 25b to passage 16 whence it flows over and across the bearing housing and through the inner curved portion of annular passage 16 to the space between plates 26 and 27, entering such space next to the bearing housing, i. e. adjacent the central portion of the wheel, and flowing radially outward between the plates and through passage 36 and passage 17 whence it discharges to atmosphere. With this arrangement, it will be seen that the coolest cooling air flows first over and around bearing housing 3, after which it flows radially outward from adjacent the central portion of the wheel toward the periphery thereof. In flowing over the bearing housing the air absorbs heat from it, after which it flows adjacent the turbine wheel, absorbing heat by direct contact with metal plate 27 which is heated by radiation from the turbine disc. Thus, the air while coolest flows over the bearing housing which is cooler than the turbine wheel and thence adjacent the turbine wheel from the neighborhood of the cooler portion of the wheel to the hottest portion, the wheel being hottest at its rim. This arrangement whereby the cooling air flows over the cooler parts first serves to give the most efficient cooling of all the parts. It will be seen that heat is thus dissipated from the turbine wheel disc by radiation and convection to the comparatively cool metal plate 27, through the plate by conduction and thence by convection to the cooling air flowing through the space between plates 26, 27.

It will be noted that in this arrangement the cooling air does not come into direct contact with the turbine wheel but flows radially outward through an annular passage adjacent the surface of the wheel, the cooling air receiving heat indirectly from the wheel by radiation to and conduction of heat through metal plate 27. The U-shaped spacers 28 serve additionally as cooling fins for conveying heat from the plate 27 to the air flowing over them. It will be observed that this additional cooling by the fins 28 is provided adjacent the hottest part of the turbine wheel.

While I have illustrated two spaced plates 26 and 27 defining the cooling air path adjacent the turbine disc, it will be apparent that the sealing plate assembly may be modified by omitting plate 26 and the single plate 27 relied upon for the sealing action. However, plate 26 increases the efficiency of the heat transfer by guiding the flow of cooling air over plate 27.

It will be noted that shroud band 23 serves to completely close or seal the admission passage 16 around its periphery. As a result, air supplied to this passage through duct 25b provides a positive and adequate flow of air to the parts to be cooled. This arrangement wherein I provide a sealed admission passage or chamber to which cooling air is supplied and from which it flows around the bearing housing and adjacent the turbine wheel and nozzle box is an important feature of my invention.

In connection with the cooling means at the upstream side of the wheel, as described above, I may also utilize a cooling means on the downstream side. Preferably the cooling means for this side of the wheel does not direct cooling air directly against the surface of the wheel but absorbs heat by radiation to and conduction through a wall adjacent to the wheel, although if desired I may employ an arrangement which directs more or less cooling air directly against the wheel. To this end, I employ a cooling cap assembly 40 which may be of the type shown in my copending application, Serial No. 431,924, filed February 23, 1942, of which this application is a division, and assigned to the same assignee as the present application. A cooling cap in accordance with United States patent to Smith 2,364,037, or any other suitable type may also be used.

In accordance with the provisions of the patent statutes, I have described the principle of operation of my invention, together with the apparatus which I now consider to represent the best embodiment thereof; but I desire to have it understood that the apparatus shown is only illustrative and that the invention may be carried out by other means.

What I claim as new and desire to secure by Letters Patent of the United States is:

1. In a gas turbine, a bearing housing, a shaft supported in the bearing housing, a turbine wheel on the shaft, a nozzle box surrounding the bearing housing in spaced relation thereto, an annular heat conducting plate adjacent to and substantially parallel to the inner side surface of the turbine wheel, walls dividing the space between the bearing housing and the nozzle box to provide passages for conveying cooling air over and across the bearing housing, thence radially outward across the side of said plate remote from the turbine wheel and thence along the surface of the nozzle box to atmosphere, and sealing means for preventing leakage of cooling air into the space between the plate and the turbine wheel.

2. In a gas turbine, a bearing housing, a shaft supported in the bearing housing, a turbine wheel on the shaft, a nozzle box surrounding the bearing housing in spaced relation thereto, an annular curved wall located in the space between the nozzle box and bearing housing to divide such space into an annular admission passage remote from the nozzle box and an annular discharge passage adjacent the nozzle box, a cylindrical wall sealing the admission passage around its periphery, a conduit for conveying cooling air to said admission passage, and a sealing plate assembly including a heat conducting plate adjacent and substantially parallel to the wheel arranged to define a flow path connecting said passages and to prevent cooling air from directly contacting the wheel.

3. In a gas turbine, a bearing housing, a shaft supported in the bearing housing, a turbine wheel on the shaft, a nozzle box surrounding the bearing housing in spaced relation thereto, an annular curved wall located in the space between the nozzle box and bearing housing extending radially inwardly and axially to a point adjacent but spaced from the turbine wheel and dividing such space into an annular admission passage and an annular discharge passage, a shroud sealing the admission passage around its periphery, a conduit for conveying cooling air to said admission passage, and sealing means including a heat conducting plate adjacent and substantially parallel to the wheel arranged to define a flow path connecting said passages and to prevent cooling air from directly contacting the wheel.

4. In a gas turbine, a bearing housing, a shaft supported in the bearing housing, a turbine wheel on one end of the shaft, a nozzle box surrounding the bearing housing in spaced relation thereto, a power consumer connected to the other end of the shaft having a casing in axially spaced relation to the turbine wheel and nozzle box, an annular curved wall located in the space between the nozzle box and said casing which extends radially inwardly and axially to a point adjacent the turbine wheel and defines an annular admission passage adjacent said casing and an annular discharge passage adjacent said nozzle box, a shroud sealing the admission passage around its periphery, a conduit for conveying cooling air to said admission passage, and sealing means including an annular heat conducting plate sealed at its inner edge to the hub portion of the wheel and at its outer edge to the nozzle box and arranged to define a flow path connecting the passages and to prevent cooling air from directly contacting the wheel.

5. In a high temperature fluid pressure turbine having a bucket wheel with a hub portion, a shaft secured to the hub portion, a bearing means supporting the shaft, and an annular nozzle box concentrically spaced from the bearing means for conducting operating fluid to the wheel, means for cooling the bearing means and the inlet side of the wheel comprising two axially spaced plates concentrically surrounding the hub adjacent and substantially parallel to the wheel to form a cooling channel, means for conducting cooling medium through the channel, and means sealing the inner and outer edges of the plate adjacent the bucket wheel to the hub of the wheel and to the nozzle box respectively.

DALE D. STREID.